United States Patent [19]

Bar-Yona et al.

[11] Patent Number: 5,022,900

[45] Date of Patent: Jun. 11, 1991

[54] FORCED VENTILATION FILTRATION DEVICE

[75] Inventors: Itzchak Bar-Yona, Neveh Monoson; Gad Bar-Sela, Tel-Aviv, both of Israel

[73] Assignee: Eagle, Military Gear Overseas Ltd., Tel-Aviv, Israel

[21] Appl. No.: 379,382

[22] Filed: Jul. 13, 1989

[30] Foreign Application Priority Data

Jul. 20, 1988 [IL] Israel .......................................... 87156

[51] Int. Cl.[5] .............................................. B01D 53/04

[52] U.S. Cl. .................................. 55/316; D55/473; D55/482; D55/DIG. 35; 128/201.25; 128/205.28; 128/205.29

[58] Field of Search .............. 55/316, 318, 356, 385.2, 55/472, 473, 482, 387, DIG. 33, DIG. 35; 128/201.25, 205.27, 205.28, 205.29, 206.17

[56] References Cited

U.S. PATENT DOCUMENTS

| | | | |
|---|---|---|---|
| 3,766,844 | 10/1973 | Donnelly et al. . | |
| 3,830,041 | 8/1974 | Huppke et al. | 55/204 X |
| 3,958,965 | 5/1976 | Raczkowski | 55/473 X |
| 4,088,461 | 5/1978 | Brauer | 128/206.17 X |
| 4,197,097 | 4/1980 | Magorien et al. | 55/165 |
| 4,331,141 | 5/1982 | Pokhis | 128/201.25 X |
| 4,385,911 | 5/1983 | Popeil et al. | 55/316 |
| 4,402,716 | 9/1983 | Chiaramonte | 55/356 |
| 4,411,675 | 10/1983 | Castella | 55/316 |
| 4,502,480 | 3/1985 | Yamamoto | 128/201.25 X |
| 4,548,626 | 10/1985 | Ackley et al. | 55/316 |
| 4,590,951 | 5/1986 | O'Connor | 128/201.25 |
| 4,640,698 | 2/1987 | Ohishi et al. | 55/502 |

FOREIGN PATENT DOCUMENTS

| | | | |
|---|---|---|---|
| 0164946 | 12/1985 | European Pat. Off. . | |
| 1233668 | 10/1960 | France . | |
| 84126 | 5/1985 | Japan | 55/387 |
| 2109246 | 6/1983 | United Kingdom . | |

*Primary Examiner*—Charles Hart

*Attorney, Agent, or Firm*—Pollock, Vande Sande and Priddy

[57] ABSTRACT

A compact, integral forced-ventilation personal respirator device for the breathing space in a gas mask, protective helmet or hood, or the like, comprises a housing including a connector for air-tight connection of the housing to the breathing space to be protected, an electric blower removably attachable to the housing and comprised of an electric motor stationary relative to the housing in the attached state of the blower and a bladed centrifugal-type rotor fixedly mounted on the output shaft of the motor, a compartment inside the housing for accommodating a filter medium, the compartment facilitating access of the output air from the blower to the filter medium, and egress of the filter air from the medium to a space communicating with the connector of the housing, whereby ambient air is drawn into the housing by the blower and forced thereby via the filter medium into the breathing space to be protected.

12 Claims, 4 Drawing Sheets

FORCED VENTILATION FILTRATION DEVICE

BACKGROUND OF THE INVENTION

The present invention relates to a personal respirator device comprising a compact, integral forced-ventilation filtration device for a closed space to be protected, which space can be the breathing space in a gas mask, a protective helmet or hood, or a closed room.

Personal respiratory protection against toxic or otherwise harmful or hazardous aerosols, vapors and gases is based on filtration, by physical and/or chemical filter media, of the breathing air prior to inhalation.

Until recently, the air was drawn through the filter by suction force produced by a person's pulmonary function. However, the need to stay in a contaminated environment for prolonged periods of time, under conditions of elevated temperatures and humidity, the need to protect the elderly and sick, as well as infants and babies, and the necessity to enable personnel to perform complex tasks while using respirator devices, has motivated the development of protective devices that utilize the forced-ventilation concept.

Forced ventilation was achieved by combining filters and blowers, using filters that were designed for non-forced ventilation applications and blowers designed for altogether different purposes, and joining these two components by an adaptor or housing.

The results of this hybridazation, known as filter-blower units, were heavy, bulky and cumbersome, inconvenient to carry and totally unsuitable for babies and small children.

SUMMARY OF THE INVENTION

It is one of the objects of the present invention to overcome the drawbacks of prior-art devices and to provide a forced-ventilation personal-respirator device that, without compromising filtration efficiency or air-flow rates, is compact, relatively flat, light, of minimal volume and suitable for persons of all ages, including babies, and that does not obstruct a person's field of view, or impede his movements.

This, according to the invention, is achieved by providing a compact, integral forced-ventilation filtration device for the breathing space in a gas mask, protective helmet or hood, or the like, hereinafter referred to as a "closed space" to be protected, comprising a housing including connector means for air-tight connection of said housing to said closed space to be protected, an electric blower removably attachable to said housing and comprised of an electric motor stationary relative to said housing in the attached state of said blower and a bladed rotor fixedly mounted on the output shaft of said motor, at least one compartment inside said housing for accommodating at least one filter medium, said compartment facilitating access of the output air from said blower to said filter medium, and egress of said air from said filter medium to a space communicating with said means of connection of said housing, whereby ambient air is drawn into said housing by said blower and forced via said at least one filter medium and said connector means into said closed space to be protected.

The invention further provides a compact, integral forced-ventilation filtration device for a closed space to be protected, comprising a housing including means for detachable, air-tight connection of said housing to a filter canister accommodating at least one filter medium and having means for air-tight connection to said closed space to be protected, an electric blower fixedly attached to said housing and comprised of an electric motor stationary relative to said housing and a bladed rotor fixedly mounted on the output shaft of said motor, whereby ambient air is drawn in by said blower and forced thereby via said filter canister into said closed space to be protected.

When used in conjunction with appropriate face-pieces, masks, hoods or helmets, the forced-ventilation filtration device according to the invention is suitable for all respiratory protection tasks, not only for protection of military personnel as well as civilians against chemical warfare agents, but also for use of workers in contaminated or hazardous industrial environments such as certain chemical installations, mines, and the like.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
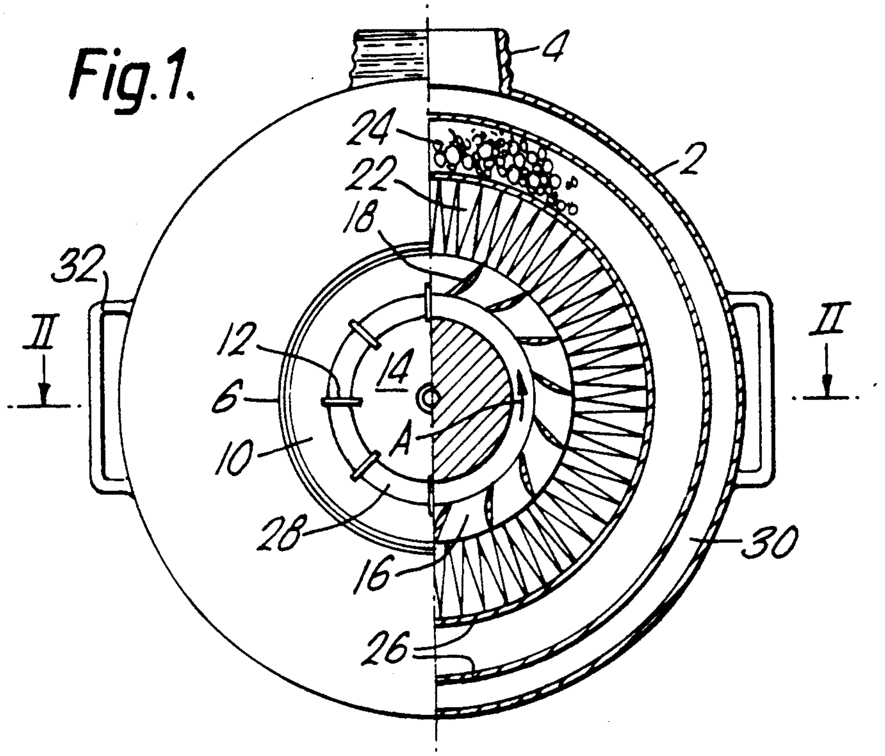
FIG. 1 is a front view, in partial cross section, of a preferred embodiment of the invention.
Figure 2:
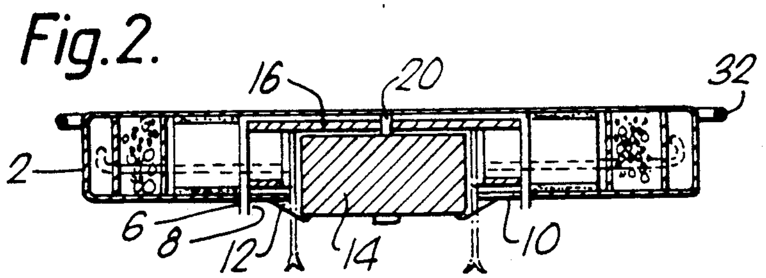
FIG. 2 is a top view, in cross section along plane II—II, of the embodiment of FIG. 1.

Referring now to the drawings, there is seen in FIGS. 1 and 2 a housing 2 provided with a connector 4 for connection, to a closed spaced to be protected, e.g., to the facepiece of a gas mask. The central portion of the front surface of housing 2 has a circular opening provided with a rim 6 having an internal thread that matches with the external thread of a similar rim 8 of a mounting ring 10 to which, via a number of ribs 12, is fixedly attached an electric motor 14 (schematically represented). A centrifugal-type rotor 16 provided with a plurality of blades 18 is mounted on the motor shaft 20. The rotor 16 is surrounded by a first filter medium, a particulate filter 22 made of a fibrous material such as, e.g., folded paper. This first filter medium is followed by a second filter medium, a bed of activated charcoal 24 held in position by being enclosed between two annular strips of wire-netting 26.

When the motor rotates in direction of arrow A, air is drawn in through the annular gap 28 between the motor 14 and the mounting ring 10 and forced towards the housing periphery. On its way, it must first pass the particulate filter 22 which removes all solid or liquid particles from any aerosol present, and then the bed of activated charcoal filter 24, which binds the gaseous contaminants. The fully filtered air then reaches the clean-air space 30 and leaves the housing 2 via the connector 4 which is either threaded as shown, or has other means for connection, e.g., of the bayonet type. Two lugs 32 projecting from the housing 2 facilitate attachment of the latter to the chest of the user by means of a belt or harness. Also provided, although not shown, is a compartment for batteries and an actuating switch.

Figure 3:
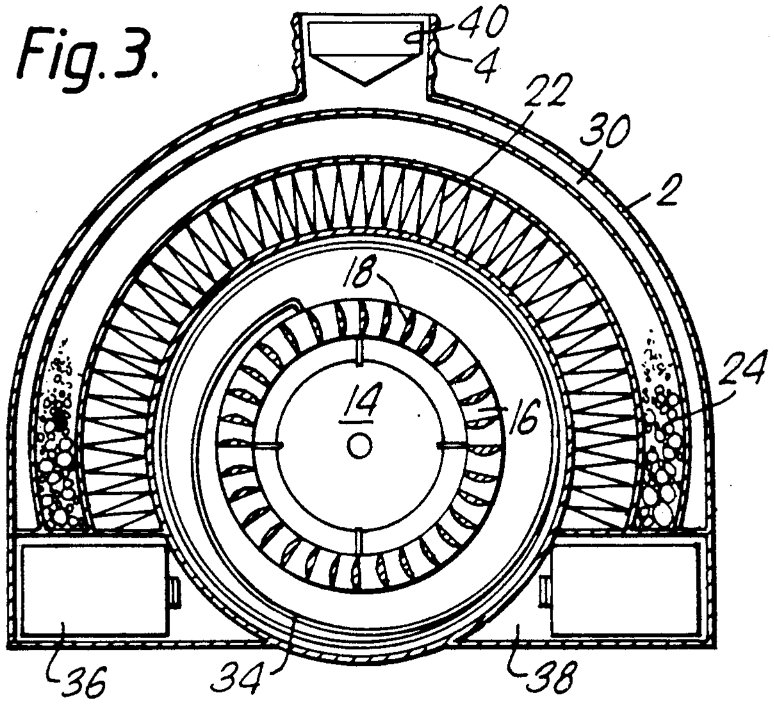
FIG. 3 represents a cross-sectional view of a variant of the embodiment of FIG. 1.

FIG. 3 represents a variant of the previous embodiment which differs from the latter in several details. That part of the housing 2 immediately surrounding the blower rotor 16 is modified by the addition of a scroll-like partition 34 which improves the dynamics of gas flow and thus increases blower efficiency. Housing shape is no longer fully cylindrical, and the batteries 36 are accommodated in two separate compartments 38. If at least the connector 4 and the part of the tubing (not shown) leading to the protected space are transparent, a float 40 can be used as visual flow indicator.

Figure 4:
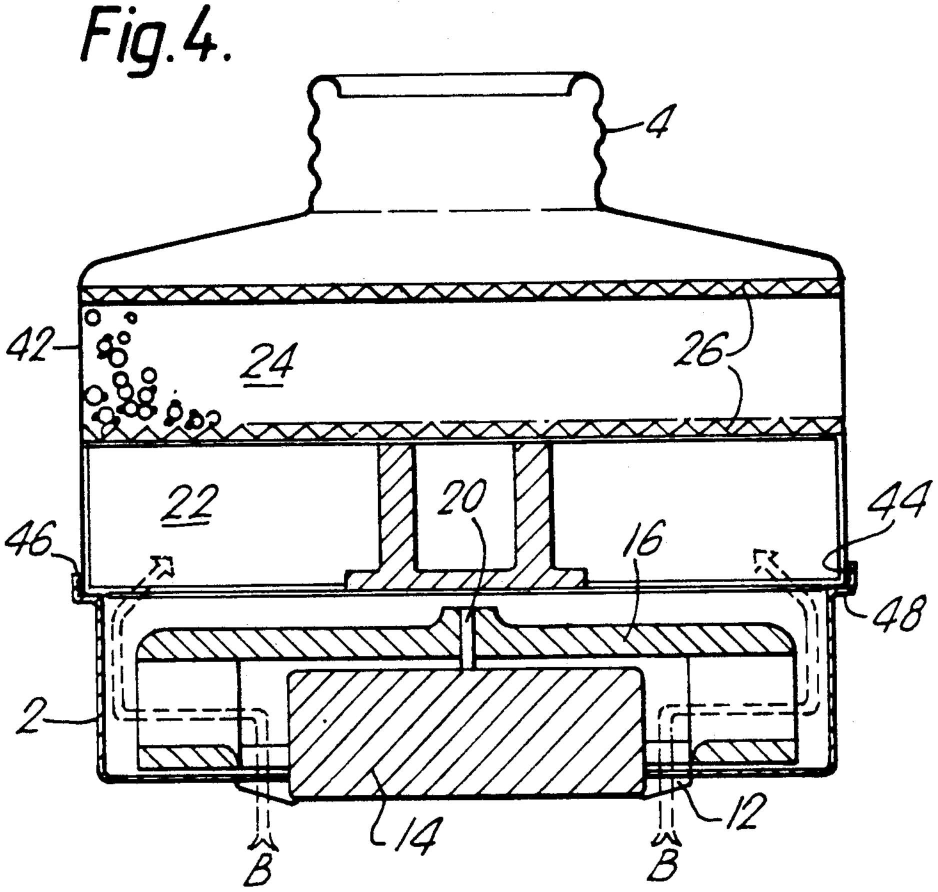
FIG. 4 shows, in cross section, another embodiment of the invention.

The filter portions of the following embodiments are all standard canisters, except for the filter 42 of FIG. 4, in which the canister is modified by being provided at its inlet end with an external thread 44 that matches an internal thread 46 provided at the abutment end 48 of the housing 2. The rest of the components are all analogues of the components enumerated in conjunction with FIGS. 1 to 3. There are seen the motor 14, the rotor 16, the particulate filter 22, the activated charcoal filter 24 within its wire mesh retainers 26 and the connector 4. The course of the air drawn in is marked by the dashed arrow B.

Figure 5:
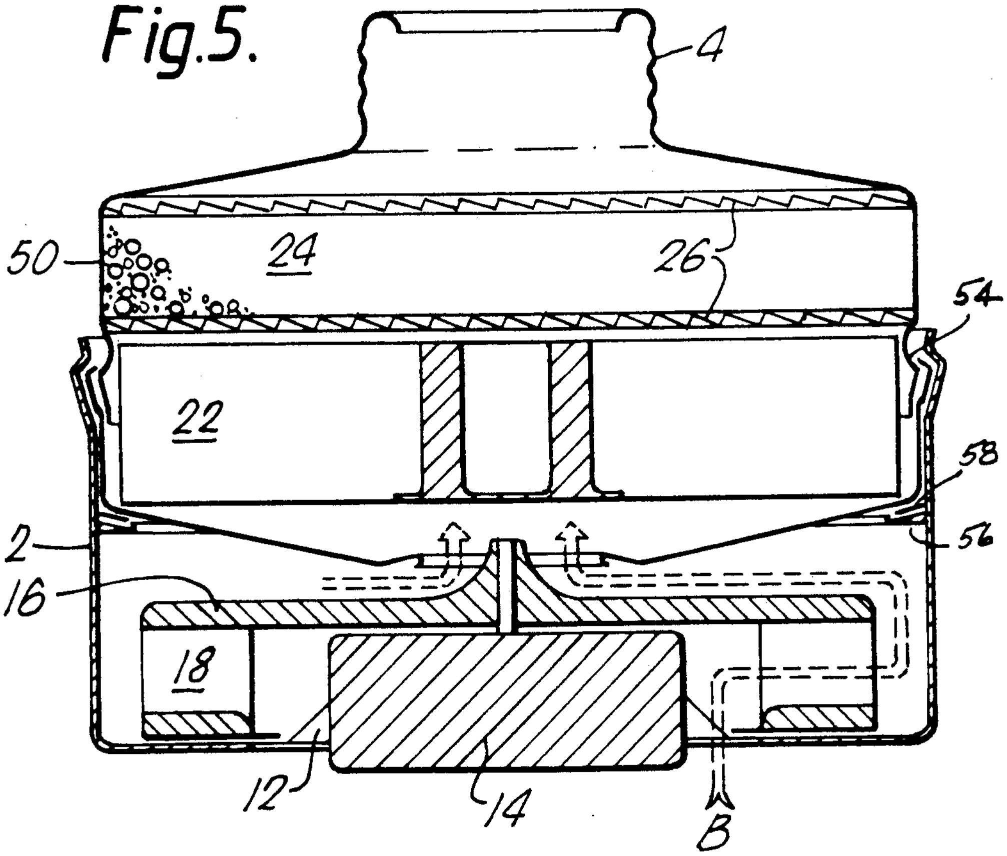
FIG. 5 is a cross-sectional view of yet another embodiment of the invention.
Figure 8:
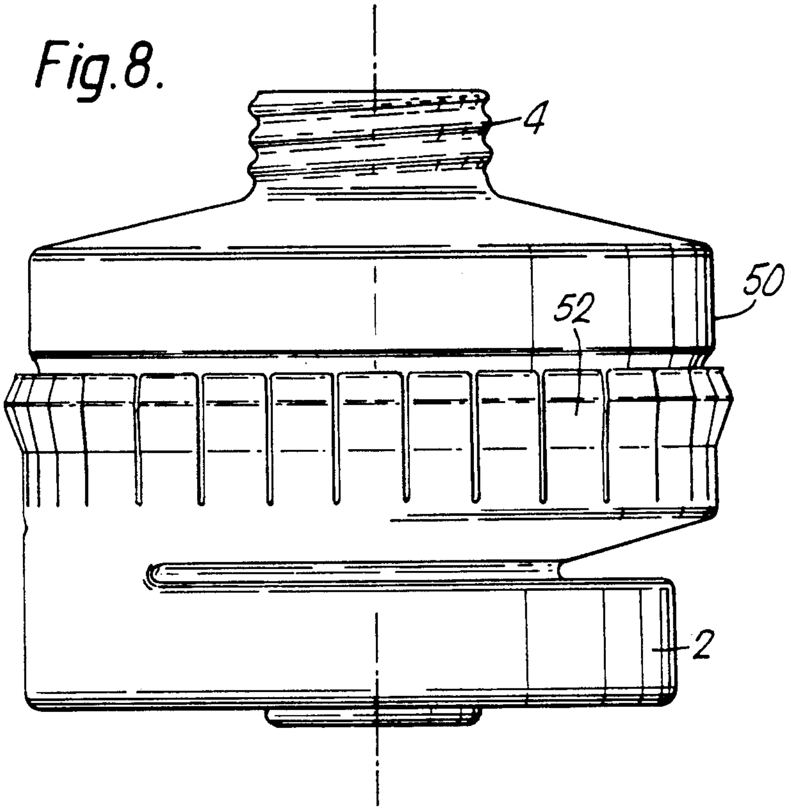
FIG. 8 is an elevational view of the embodiment of FIGS. 6 and 7.

The embodiment of FIG. 5 differs from that of FIG. 4 in that the canister 50 is a standard canister to which is attached, by means of a snap-in arrangement, the blower housing 2. The snap-in joint is realized by slotting and shaping the end of the housing 2 as shown in FIG. 8, thus providing a plurality of elastic tongues the ends of which engage in the grooved joint 54 of the canister casing and pulling it down against an abutment shoulder 56 of the housing 2. A sealing ring 58 is interposed between the canister 50 and the shoulder 56. The snap-in joint facilitates easy and rapid removal of the canister 50 for replacement, as well as reattachment of a new canister.

Figure 6:
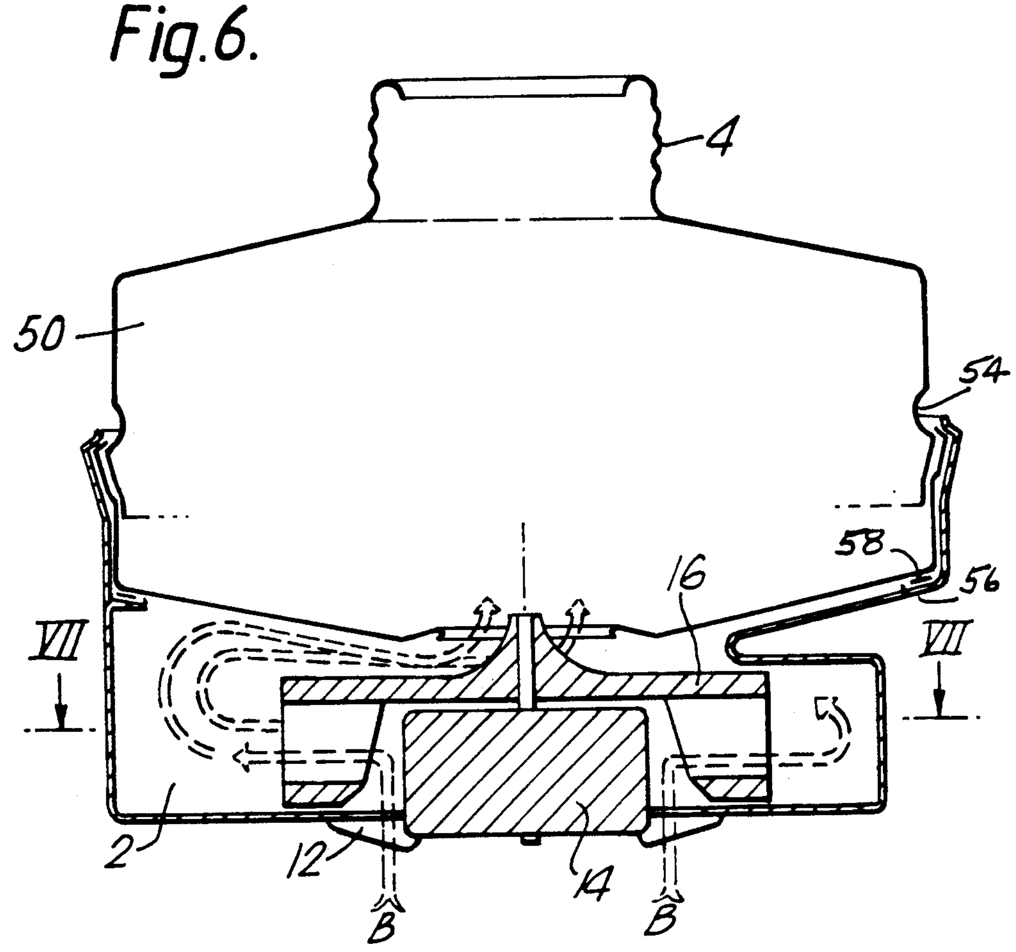
FIG. 6 represents a cross-sectional view of still another embodiment of the invention, similar to that of FIG. 6, but with a scroll-type housing.
Figure 7:
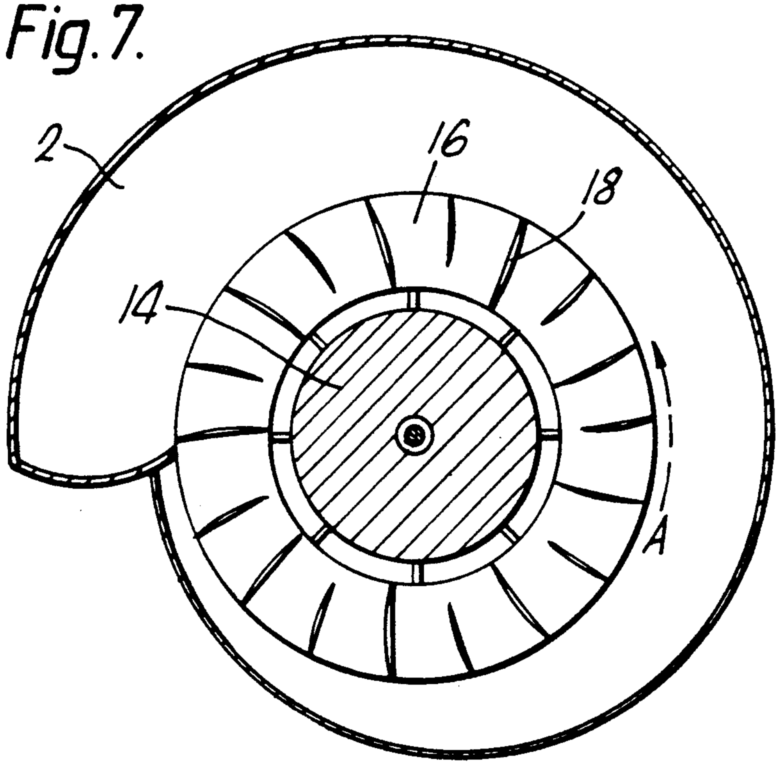
FIG. 7 is a view, in cross section along plane VII—VII, of the embodiment of FIG. 6.

The embodiment of FIGS. 6 and 7 has a scroll-type housing 2, the advantages of which have been mentioned in conjunction with the embodiment of FIG. 3. The canister 50 and its snap-in attachment to the housing 2 remain unchanged. A general view of this embodiment is represented in FIG. 8.

Figure 9:
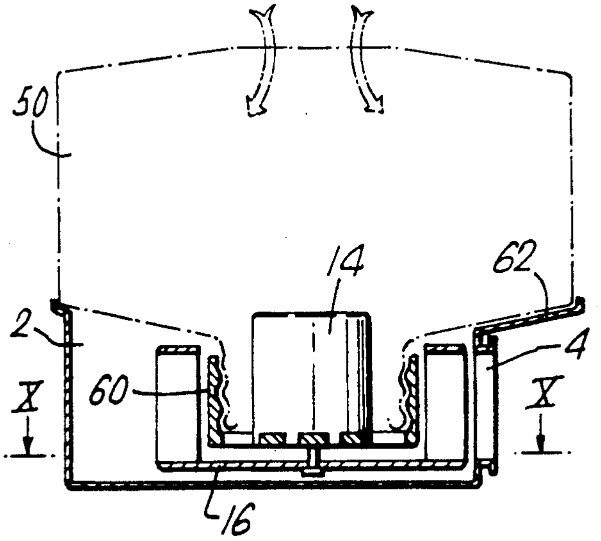
FIG. 9 is a cross-sectional view of another embodiment having a scroll-type housing.
Figure 10:
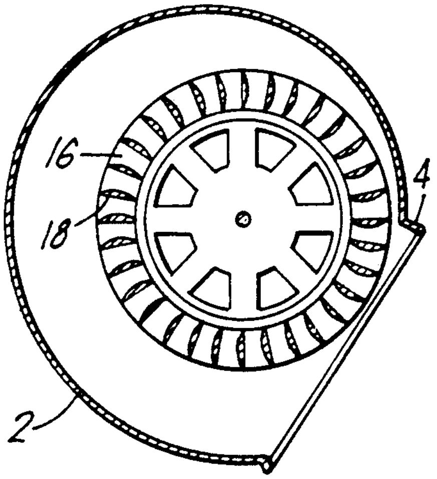
FIG. 10 is a view, in cross section along plane X—X, of the embodiment of FIG. 9.

Another embodiment with a scroll-type housing 2 is represented in FIGS. 9 and 10. Here, the canister is screwed into a socket 60 integral with the motor 14, until firmly seated against the flange-like rim 62 of the housing 2. The connector 4 in this embodiment is rectangular and snaps into the matching counterpart of the tube (not shown) that leads to the protected space. A further difference between this and the other embodiments resides in the fact that here the ambient air is drawn, rather than pushed, through the filter of the canister, as indicated by the dashed arrows C.

The sources of electric power for the blowers have not been described in detail. They can be batteries accommodated in special compartments of the ventilation device, as mentioned in conjunction with the embodiment of FIG. 3, or carried as a separate battery pack. Depending on the use of the device, it is also possible to utilize an external power supply other than batteries.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A compact, integral forced-ventilation personal respirator device comprising:

means defining a closed personal breathing space to be protected;

a housing including connector means for air-tight connection of said housing to said closed space to be protected;

an electric blower removably attachable to said housing and comprised of an electric motor stationary relative to said housing in the attached state of said blower and a bladed centrifugal-type rotor fixedly mounted on the output shaft of said motor; and at least one at least partly annular compartment inside said housing for accommodating at least one filter medium of at least partly annular configuration located downstream of said blower, both said electric motor and the rotor of said blower being disposed within a space inside of said partly annular filter medium, at least a portion of the blading of said rotor being substantially coplanar with said filter medium, said compartment providing access of the output air from said blower to said filter medium and egress of filtered air from said filter medium to a space communicating with said connector means of said housing, whereby ambient air is drawn into said housing by said blower and forced thereby via said at least one filter medium and said connector means into said closed space to be protected.

2. The personal respirator device as claimed in claim 1, wherein said housing comprises at least two of said compartments, one each for two different filter media.

3. The personal respirator device as claimed in claim 1, wherein said housing is substantially cylindrical and said blower is substantially concentric with said housing.

4. The personal respirator device as claimed in claim 1, wherein at least that portion of the housing which directly surrounds said blower is of the scroll-type.

5. The personal respirator device as claimed in claim 1 further comprising means for receiving at least one battery cell used to energize said electric motor.

6. The personal respirator device as claimed in claim 1, further comprising flow indicator means for indicating air flow through said connector means.

7. The personal respirator device of claim 1 wherein said compartment inside said housing accommodates at least two filter media, a first one of said media, disposed closest to said blower, being a particulate filter made of a fibrous material, and a second one of said media comprising a bed of activated charcoal located downstream of said first medium.

8. A compact, integral forced-ventilation personal respirator device comprising:

means defining a closed personal breathing space to be protected;

a housing including means for detachable, air-tight connection of said housing to a filter canister containing at least one filter medium and having means for air-tight connection of said canister to said closed space to be protected; and a blower fixedly attached to said housing upstream of said filter canister and comprised of an electric motor stationary relative to said housing and a bladed centrifugal-type rotor fixedly mounted on the output shaft of said motor, at least that portion of said housing which accommodates the blading of said blower rotor being of the scroll-type, said blower being eccentrically attached to said portion with at least a portion of said motor being disposed inside of said centrifugal-type rotor, whereby ambient air is drawn into said housing by said blower and forced out of said housing via said filter canister into said closed space to be protected.

9. The personal respirator device as claimed in claim 8, wherein said filter canister is substantially cylindrical and said blower is substantially concentric with said filter canister.

10. The personal respirator device as claimed in claim 8, wherein said means for detachable connection of said housing to said filter canister is a thread connection.

11. The personal respirator device as claimed in claim 8, wherein said means for detachable connection of said housing to said filter canister is a snap-in connection.

12. The personal respirator device of claim 8 wherein said filter canister is a standard respirator canister.

* * * * *